US008312618B2

United States Patent
Hedman et al.

(10) Patent No.: US 8,312,618 B2
(45) Date of Patent: Nov. 20, 2012

(54) MODULE SYSTEM FOR MANUFACTURING TWO AND THREE STABLE POSITIONS FLUID-OPERATED ACTUATORS

(75) Inventors: Anders Hedman, Marstrand (SE); Petter Frejinger, Kållered (SE)

(73) Assignee: Volvo Lastvagnar AB, Göteborg (SE)

(*) Notice: Subject to any disclaimer, the term of this patent is extended or adjusted under 35 U.S.C. 154(b) by 687 days.

(21) Appl. No.: 12/515,739

(22) PCT Filed: Nov. 22, 2006

(86) PCT No.: PCT/SE2006/001327
§ 371 (c)(1),
(2), (4) Date: Oct. 15, 2009

(87) PCT Pub. No.: WO2008/063104
PCT Pub. Date: May 29, 2008

(65) Prior Publication Data
US 2010/0024205 A1    Feb. 4, 2010

(51) Int. Cl.
*B23P 19/00* (2006.01)
*B23P 17/00* (2006.01)
*F01B 31/14* (2006.01)
*F16D 33/00* (2006.01)

(52) U.S. Cl. .......... 29/700; 29/890.09; 92/13; 92/33; 92/62; 92/131; 92/135; 60/325; 60/329

(58) Field of Classification Search .......... 29/700, 29/890.09; 92/33, 62, 75, 131, 135, 13; 60/325; 60/329
See application file for complete search history.

(56) References Cited

U.S. PATENT DOCUMENTS

| | | | | |
|---|---|---|---|---|
| 3,613,519 A * | 10/1971 | Southall | ........... | 92/95 |
| 3,958,493 A * | 5/1976 | Fujita et al. | ........... | 91/525 |
| 4,934,652 A * | 6/1990 | Golden | ........... | 251/63.6 |
| 4,974,495 A * | 12/1990 | Richeson, Jr. | ........... | 91/459 |
| 5,012,725 A * | 5/1991 | Leary | ........... | 92/63 |
| 5,067,323 A * | 11/1991 | Bennett et al. | ........... | 60/734 |
| 5,125,326 A | 6/1992 | Sarcona | | |
| 5,165,322 A * | 11/1992 | Moody | ........... | 92/65 |
| 5,247,872 A * | 9/1993 | Hoshi | ........... | 92/52 |
| 6,386,508 B1 * | 5/2002 | Steil et al. | ........... | 251/31 |
| 6,474,214 B2 * | 11/2002 | Takeuchi et al. | ........... | 92/13.1 |
| 6,484,600 B1 * | 11/2002 | Bennett et al. | ........... | 74/473.11 |

FOREIGN PATENT DOCUMENTS

| | | | |
|---|---|---|---|
| EP | 1035357 A1 | 9/2000 | |
| EP | 1055845 A2 | 11/2000 | |
| GB | 759235 A | 10/1956 | |
| GB | 1287259 A | 8/1972 | |
| WO | WO 2008063104 A1 * | 5/2008 | |

OTHER PUBLICATIONS

International Search Report for corresponding International Application PCT/SE2006/001327.

* cited by examiner

*Primary Examiner* — Essama Omgba
(74) *Attorney, Agent, or Firm* — WRB-IP LLP

(57) ABSTRACT

In a module system for manufacturing variants of two and three stable positions fluid-operated actuators a cylinder housing of both variants of two and three stable positions actuators is manufactured from a blank. The blank includes at least one opening for a cover and is identical for the variants of the two and three stable position actuator, and is at least prepared for the arrangement of a first pressure duct, a second pressure duct, and a first cylinder diameter of the cylinder housing.

19 Claims, 4 Drawing Sheets

MODULE SYSTEM FOR MANUFACTURING TWO AND THREE STABLE POSITIONS FLUID-OPERATED ACTUATORS

BACKGROUND AND SUMMARY

The present invention relates to actuators operated by fluid pressure, and more particularly to a manufacturing module system for having variants thereof with two and three stable positions.

Fluid-operated actuators, that is, actuators that are operated with fluid pressure are widely used. Some examples are hydraulic cylinders in excavators and pneumatic cylinders in production automation equipment. In transmissions for heavy trucks and buses, pneumatic actuators are often used for automation, fully or in part, of the gear shifting.

Simplified, a simple fluid-operated actuator is composed of a cylinder housing, at least one cover and a piston that is fixedly connected to a piston rod. The piston is located inside the cylinder housing and cover. Thereby two pressure chambers are created, one on each side of the piston. A sealing arrangement allows a difference in pressure between these chambers. By applying fluid pressure in either chamber, force is applied on the piston that will urge to move. The cylinder housing and cover allow axial motion of the piston and piston rod between two end positions. These end positions will be referred to as stable positions. They correspond to equilibrium positions when fluid pressure is applied in either chamber.

For special purposes, more complex fluid-operated actuators have been developed. More than two stable positions have been achieved by means of more chambers and additional coaxial pistons. These additional pistons have a limited axial motion possible relative to both the cylinder housing and the piston rod.

A typical transmission for a heavy truck is shown in EP1035357. In order to achieve a large number of useful gear ratios with a limited number of gearwheels, the transmission is composed of three main functional units; a splitter section 34, a main section 35 and a range section 38. The splitter section provides two possible paths of transmitting the power from an input shaft 2 to a countershaft 4. Which of these paths that is active is determined by a double-acting tooth clutch ("synchronised coupling") 12. The main section 35 provides several possible paths of transmitting the power from the countershaft 4 to a main shaft ("intermediate shaft") 3. A number of tooth clutches 18, 20 and 32 can be engaged, one at a time, to make these paths active. Finally, the range section 38 can be regarded as a two-speed gearbox that is connected in series with the main section 35. The range section has a speed reduction gear, normally referred to as low range, and a direct gear, high range, that has no speed change. The position of a tooth clutch sleeve 44 determines which range gear that is active.

In most heavy truck transmissions, the splitter section and the range section are operated by pneumatic actuators. Conventionally, the tooth clutch in the splitter section has two stable positions, one for each of said paths. Likewise, the range section tooth clutch conventionally has two stable positions, one for high range and one for low range. Thus, in the conventional case the splitter section and the range section can each be operated by a simple pneumatic actuator that has two stable positions.

In recent years, solutions have been presented that would make it advantageous in some cases to use a middle, neutral, position in the splitter section or the range section. EP1035357 presents a splitter section with a neutral position that is used to reduce the risk of damaging the transmission at some inappropriate shifts. However, such a device would not be necessary for some designs of gear lever and shift pattern for the main section. Neither would it be required for automated variants of the transmission in question.

Furthermore, EP1055845 presents a range section that has a neutral position. This is used to reduce the effort at manual main section shifts, and it enables the use of smaller and less costly tooth clutches. It would also facilitate the use of simple centrifugal clutches, like the one presented in US-2004/0262115, since the clutch does not need to be disengaged during a main section shift. However, the shift time might increase, and the use in automated variants can be questioned.

In conclusion, splitter sections and range sections with a neutral position may not be used in all variants of a heavy truck transmission family. In some cases, it would make sense to use the simpler conventional design with two stable positions and no neutral position.

So, there is a need for a way to enable variants with two or three stable positions of fluid-operated actuators in a cost-efficient way. According to an aspect of the present invention, substantially the same blank is used for the cylinder housings of the actuator variants with two and three stable positions. In a first embodiment the invention is characterized in that said blank comprises at least one opening for said cover and that it is identical for said variants of said two and three stable position actuator, and that the blank is at least prepared for the arrangement of:

a first pressure duct,
a second pressure duct and
a first cylinder diameter of said cylinder housing.

It can be noted that the cylinder housing in general is a large and fairly expensive part whose blank requires a complex and costly tool. The cylinder housing blank can be, for instance, cast, forged, extruded, pressed or injection moulded. The blank will be finished to a cylinder housing by means of operations like milling and honing of cylinder and sealing surfaces, drilling of access ducts to the pressure chambers, and making fastening arrangements for the cover. If the same blank can be used for different actuator variants, the costs for tooling can be reduced, and higher production volumes of the blank can be achieved. According to another embodiment of the invention it is also possible that at least one of said first and second pressure ducts and said first cylinder diameter are finally produced with same set of tools creating same dimensions for said at least one of said first and second pressure ducts and said first cylinder diameter respectively in both said two and three stable position variants. According to a further developed embodiment of the invention the same set of tools can be used in both said two and three stable position variants, thus creating same dimensions for said first and second pressure duct and said first cylinder diameter respectively for all variants.

In a preferred embodiment, the actuator is an integrated part of an actuator unit that comprise, for instance, sensors, other actuators and valves that control the flow of pressurised fluid to the pressure chambers. The cylinder housing is part of a large housing whose blank requires very high tooling costs. Thereby, it is of particular advantage to avoid variants of the blank.

In another preferred embodiment, the variant with three stable positions is designed with a main piston, which is fixedly attached to the piston rod, and a ring piston with limited axial motion relative to the main piston. There are three cylinder-piston system diameters, one small between said main and ring pistons, one larger for the main piston alone, and one even larger for the ring piston alone. This largest diameter is identical to the cylinder-piston diameter of the variant with two stable positions. This gives a compact design with substantially equal actuator strokes between the end positions for the variants with two and three stable positions.

In still another preferred embodiment, there is a ring-shaped protrusion in the cover for the variant with three stable positions. The inner periphery of this protrusion serves as the outer part of a cylinder-piston system for the main piston and one of the pressure chambers. A duct between the inner and outer peripheries form a part of the supply duct to said pressure chamber. The outer periphery of the protrusion also forms part of sealing devices between an intermediate chamber, said supply duct and the ambient air. With this design, the required different cylinder-piston diameters are achieved in a convenient way.

In yet another preferred embodiment, on said outer periphery between said supply duct and said intermediate chamber, the sealing device has a larger diameter than the cylinder-piston system diameter of the variant with two stable positions. Thereby, said intermediate chamber can have a breathing duct in the cylinder housing that will not risk damaging the sealing device of said large-diameter cylinder-piston system of said ring piston.

In a further preferred embodiment, the devices that guide and centre the axial motion of said ring piston are axially spaced apart. This will improve the stability of that motion.

In an additional preferred embodiment, the breathing duct for the intermediate chamber is located in the cover. Thereby, the cylinder housing can be the same for both two and three stable position variants.

In an alternative preferred embodiment, the breathing duct is located in the main piston and piston rod. The cylinder housing can be the same for both two and three stable position variants here, too. Moreover, if the main piston is attached to the piston rod with a hollow pin, that pin could be a part of the breathing duct.

BRIEF DESCRIPTION OF THE DRAWINGS

The invention will be exemplified by means of the enclosed drawings.

DETAILED DESCRIPTION

Figure 1:
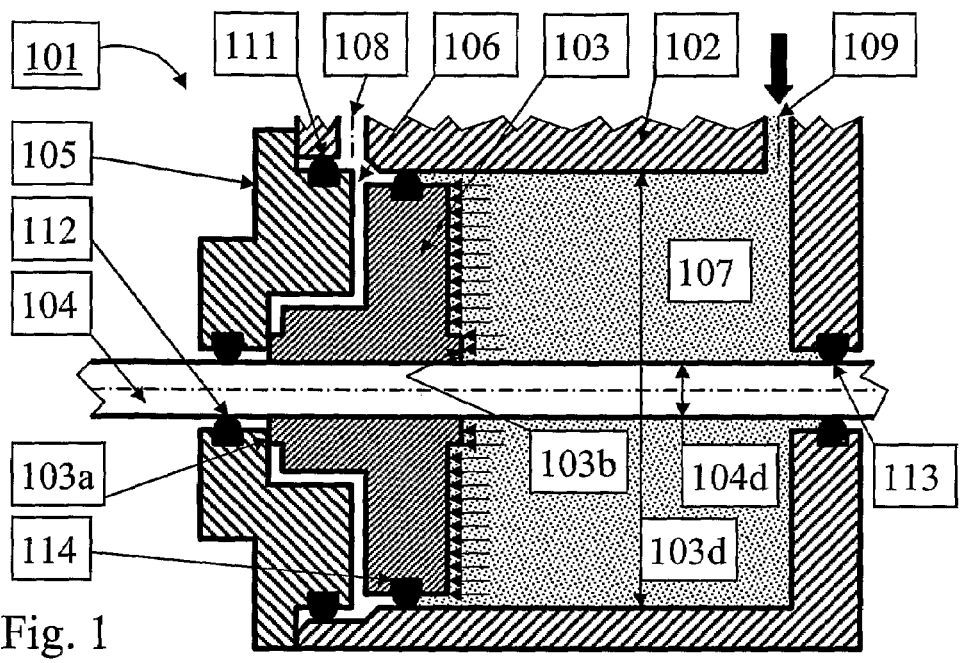
FIG. 1 shows a schematic longitudinal section of a typical fluid-operated actuator with two stable positions, which as such is an example of prior art, but which also is part of the inventive module system.

FIG. 1 shows a simplified longitudinal section of a fluid-operated actuator 101 with two stable positions, which actuator forms a part of the inventive module system and which as such can be regarded as conventional technique, comprising a cylinder housing 102, piston 103, piston rod 104 and cover 105. The cylinder housing 102 and the cover 105 are axially connected in a not showed way. Thereby, the cylinder housing 102, piston rod 104 and cover 105 will enclose a left pressure chamber 106 and a right pressure chamber 107 on either side of the piston 103. The cylinder housing 102 has a left supply duct 108 and a right supply duct 109 that are in fluid connection with the left pressure chamber 106 and right pressure chamber 107, respectively. Valves (not shown) connect the left supply duct 108 and right supply duct 109 to either a pressure supply or to an exhaust of ambient pressure.

In FIG. 1 the right supply duct 109 is connected to the pressure supply. Thereby, the right pressure chamber 107 is filled with pressurized fluid and a fluid pressure acts on the piston 103. The left supply duct 108 is connected to the exhaust, and hence there is ambient pressure in the left pressure chamber 106. So, the piston 103 and piston rod 104 are urged to move to the left. The leftwards motion is stopped when the left end stop abutment 103a of the piston 103 comes into contact with the mating part of the cover 105. This represents the left stable position of the actuator 101. Similarly, if the left supply duct 108 were connected to the pressure supply and the right supply duct 109 were connected to the exhaust, then the piston 103 and piston rod 104 would be urged to the right. The right stable position would then be reached when the right end stop abutment 103b of the piston 103 is in contact with the mating part of the cylinder housing 102.

In order to prevent leakage between the pressure chambers and the surroundings, sealing devices are required. Sealing devices can be of any of different available types, as readily known by a person skilled in the art, for instance elastomeric lip seal type. Furthermore, for proper function the axially moving parts, as the piston 103 and piston rod 104, need to be centred and kept substantially coaxial with the mating parts of the cylinder housing 102 and cover 105. This is achieved by means of guiding devices that can be of various types, for instance polymeric guide bands or ball bushings, as would be known by a person skilled in the art. A sealing device may be integrated with a guiding device, but may also be separate. In case of separate, non-integrated, sealing and guiding devices, they may be located close to each other or wide apart. They may even act on different surfaces, as would be recognized by a person skilled in the art. In the figures of the present document, the guiding devices are left out, for simplicity, or can be regarded as integrated in the sealing devices, where appropriate. So, in FIG. 1 there is a static sealing device 111 (e.g. o-ring or gasket) to prevent leakage between the cylinder housing 102 and cover 105 from the left pressure chamber 106. Moreover, a left rod sealing device 112 prevents leakage between the cover 105 and piston rod 104. Similarly, a right rod sealing device 113 prevents leakage between the cylinder housing 102 and piston rod 104 from the right pressure chamber 107.

Finally, a piston sealing device 114 on the outer periphery of the piston 103 prevents leakage between the pressure chambers 106 and 107.

In the right pressure chamber 107, the fluid pressure acts on the piston 103 on an effective ring-shaped area defined by a cylinder-piston system diameter 103d and a piston rod diameter 104d. The actuator 101 has its piston rod 104 extending out of the cylinder housing 102 and cover 105 on both sides. This is a general case, designs where the piston rod extends out on one side, only, are also common. In such a case, the pressure in one of the pressure chambers will act on an effective circular area defined by the cylinder-piston system diameter 103d.

Figure 2A:
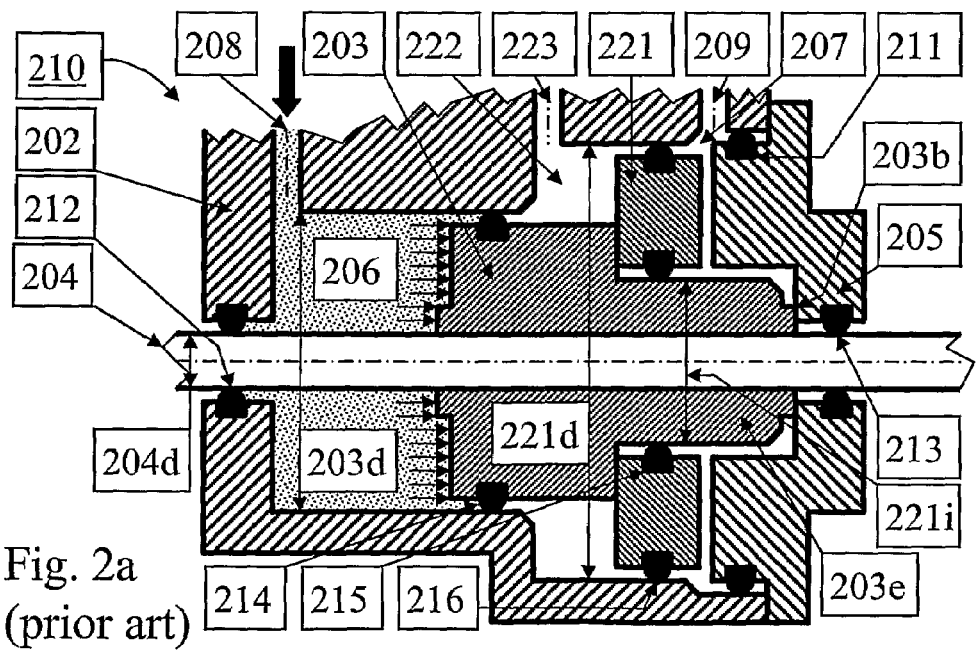
FIGS. 2a, 2b and 2c show a schematic longitudinal section of a typical fluid-operated prior art actuator with three stable positions in each of these three stable positions.
Figure 2B:
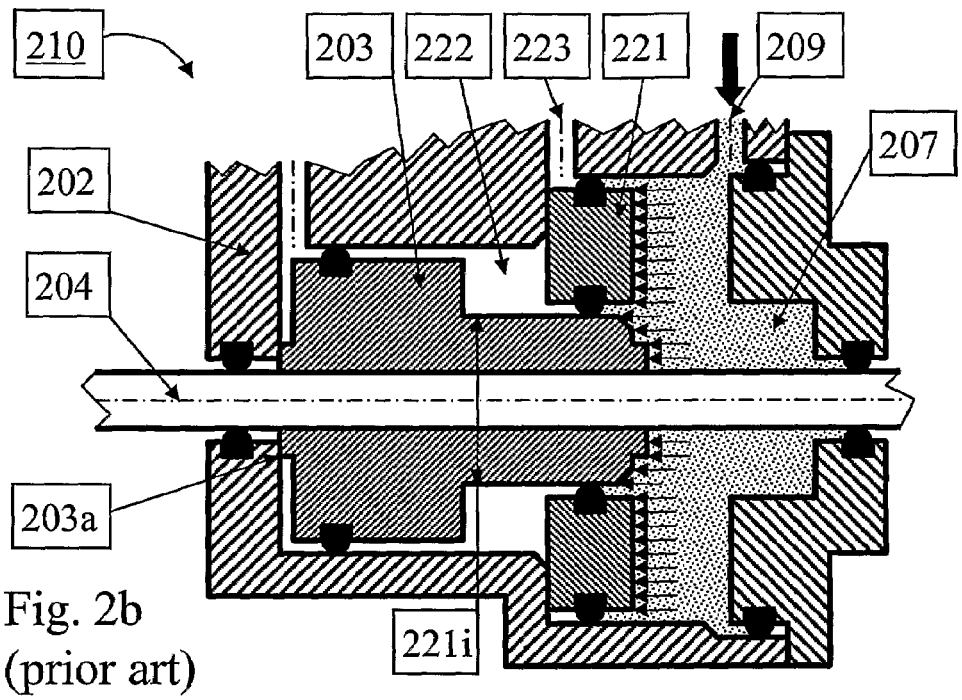
Figure 2C:
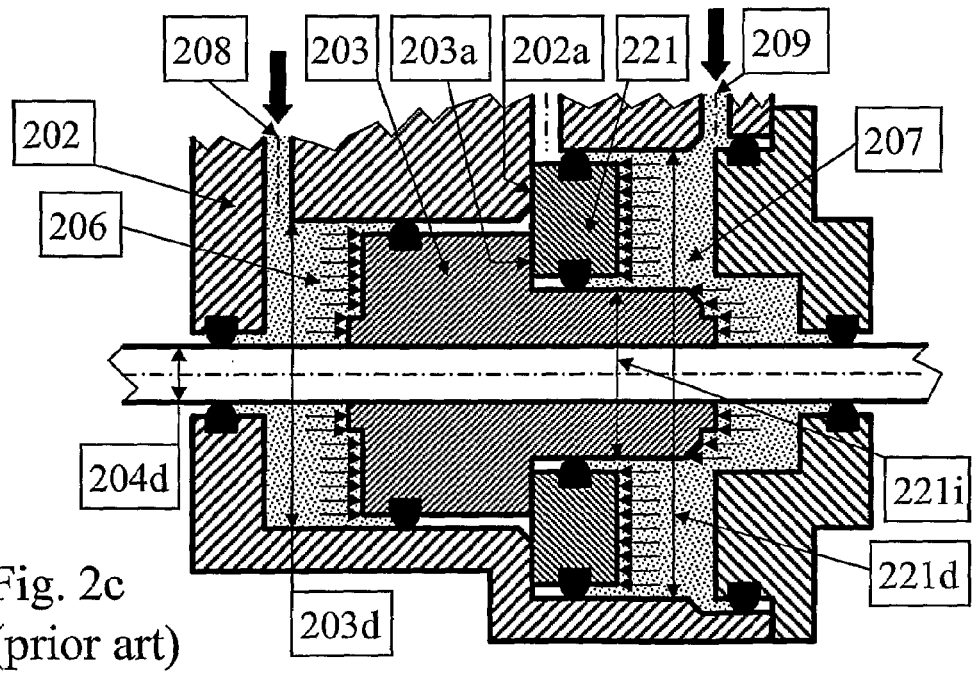

FIGS. 2a, 2b and 2c show a prior art fluid-operated actuator 210 with three stable positions. A cylinder housing 202 and a cover 205 enclose a main piston 203, which is fixedly attached to a piston rod 204, and a ring piston 221. The cylinder housing 202, main piston 203 and piston rod 204 enclose a left pressure chamber 206 where the pressure can act on the main piston 203 on an effective ring-shaped area defined by a main cylinder-piston system diameter 203d and a piston rod diameter 204d. The ring piston 221 is located on the outside of an axial extension 203e of the main piston 203. The axial motion of the ring piston 221 is limited by diameter steps in the cylinder housing 202, main piston 203 and cover 205. A right pressure chamber 207 is enclosed by the cylinder housing 202, main piston 203, piston rod 204, cover 205, and ring piston 221. A pressure in the right pressure chamber 207 will act on the ring piston 221 on an effective ring-shaped area defined by an outer cylinder-piston system diameter 221d (between the cylinder housing 202 and ring piston 221) and an inner cylinder-piston system diameter 221i (between the ring piston 221 and axial extension 203e of the main piston 203). Furthermore, a pressure in the right pressure chamber 207 will act on the main piston 203 on an effective ring-shaped area defined by the inner cylinder-piston system diameter 221i and the main cylinder-piston system diameter 203d and a piston rod diameter 204d. Between the left pressure chamber 206 and the right pressure chamber 207 there is an intermediate pressure chamber 222 enclosed by the cylinder housing 202, main piston 203 and ring piston 221.

The left pressure chamber 206 is in fluid connection with a left supply duct 208. Similarly, the right pressure chamber 207 is in fluid connection with a right supply duct 209. Valves (not shown)' connect the supply ducts 208 and 209 to either a pressure supply or to an exhaust of ambient pressure. The intermediate chamber 222 is not to be pressurized; hence a breathing duct 223 in the cylinder housing 202 connects it to ambient pressure.

A static sealing device 211 prevents leakage between the cylinder housing 202 and cover 205 from the left pressure chamber 206. A left rod sealing device 212 prevents leakage between the cylinder housing 202 and piston rod 204. Similarly, a right rod sealing device 213 prevents leakage between the cover 205 and piston rod 204 from the right pressure chamber 207. A main piston sealing device 214 on the outer periphery of the main piston 203 prevents leakage between the left pressure chamber 206 and the intermediate chamber 222 at the main cylinder-piston system diameter 203d. On the ring piston 221 there are two sealing devices that prevent leakage between the right pressure chamber 207 and the intermediate chamber 222; an inner ring piston sealing device 215 at the inner cylinder-piston system diameter 221i and an outer ring piston sealing device 216 at the outer cylinder-piston system diameter 221d.

In FIG. 2a the left pressure chamber 206 is pressurized. The fluid pressure will urge the main piston 203 and piston rod 204 to the right. A right stable position is reached when the right end stop abutment 203b of the main piston 203 is in contact with the mating part of the cover 205.

In FIG. 2b the right pressure chamber 207 is pressurized. The fluid pressure has urged the main piston 203 and piston rod 204 to a left stable where the left end stop abutment 203a of the main piston 203 is in contact with the mating part of the cylinder housing 202.

Finally, in FIG. 2c both the left pressure camber 206 and right pressure chamber 207 are pressurized. A middle stable position is thereby reached when the ring piston 221 mates with a housing diameter step abutment 202a in the cylinder housing 202 and with a piston diameter step abutment 203a on the main piston 203. The pressure in the left pressure chamber 206, acting between diameters 203d and 204d, cannot alone push the main piston 203 to the right of this position, since that would lift the ring piston 221 off the housing diameter step abutment 202a. That motion would be counteracted by the pressure in the right pressure chamber 207 that acts on the larger area between diameters 221d and 204d. Analogously, a motion of the main piston 203 to the left of the middle stable position would axially separate the ring piston 221 from the piston diameter step abutment 203a. Thus, the pressure in the right pressure chamber 207, acting between diameters 221i and 204d, cannot alone push the main piston 203 left of the middle stable position, since that would be counteracted by the left pressure chamber 206 whose pressure acts on the larger area between diameters 203d and 204d.

Figure 3:
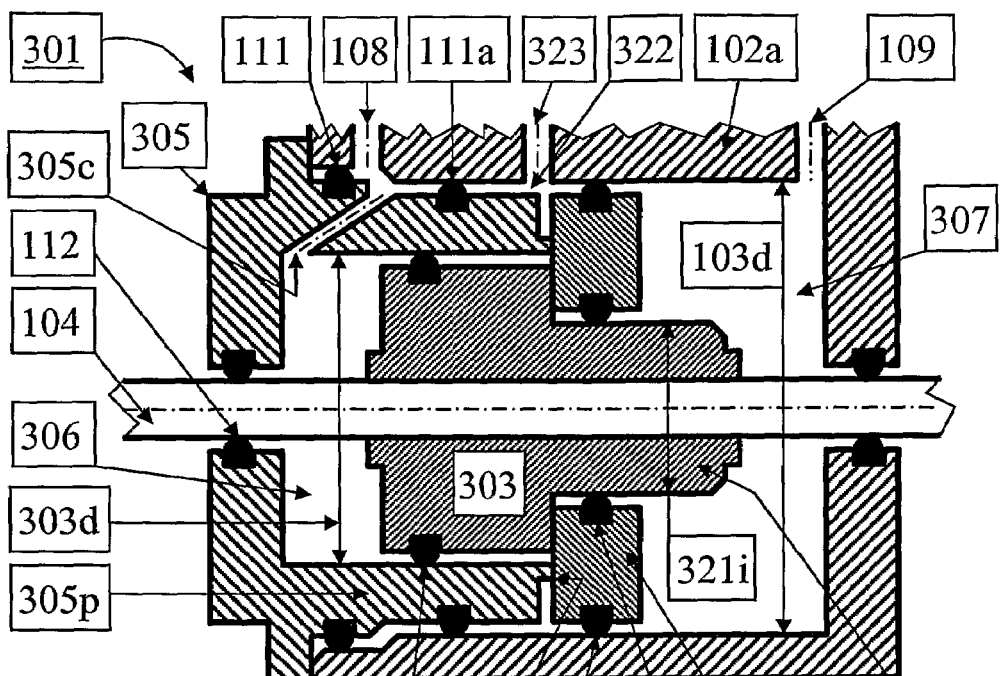
FIG. 3 shows an embodiment of the invention with a ring-shaped protrusion on the cover.

FIG. 3 shows a fluid-operated actuator 301 with three stable positions that is a variant of the plain actuator 101 in FIG. 1, and thus part of the inventive module system. The cylinder housing 102a has been modified with an additional breathing duct 323 for the intermediate chamber 322. A cover 305 is fixedly attached to, mated against or, preferably, integral with a ring-shaped protrusion 305p, whose inner periphery forms the cylinder-piston sealing diameter 303d for the left pressure chamber 306 and main piston 303 with sealing device 314. There is a cover supply duct 305c in the cover 305 that provides a fluid connection between the left supply duct 108 and the left pressure chamber 306. A cover abutment 305a defines the middle stable position for a ring piston 321. Leakage from the supply ducts 108 and 305c are prevented by static sealing devices 111 and 111a. The original cylinder-piston system diameter 103d of the cylinder housing 102 serves in the variant 102a as the sealing diameter for the static sealing device 111a and as the cylinder-piston system diameter for the right pressure chamber 307 and outer sealing device 316 of the ring piston 321. An inner sealing device 315 acts at cylinder-piston system diameter 321i on an extension 303e of the main piston 303.

The difference between the original cylinder housing 102 of the plain actuator 101 and the cylinder housing 102a is minimal. The breathing duct 323 for the intermediate chamber 322 has been added in the cylinder housing 102a. Thereby, according to the invention, the same blank can be used for both cylinder housings 102 and 102a. That will save tooling costs and facilitate the use of variants with two and three stable positions. That is especially the case when the cylinder housings 102 and 102a are integrated with other parts, for instance a gear-shift control unit in a vehicle transmission, and, hence, would require complex and expensive tooling.

In the fluid-operated actuator 301 in FIG. 3 the cylinder-piston system diameter 103d of the cylinder housing 102a is used for the outer sealing device 316 of ring piston 321 as well as for the static sealing device 111a. That may facilitate the manufacturing of the cylinder housing blank and the machining thereof. However, edges and burrs may occur where the breathing duct 323 ends at the cylinder-piston system diameter 103d. This will pose a risk of damaging the outer sealing device 316 at the assembly, when the seal surface will pass over the end of the breathing duct 323.

Figure 4:
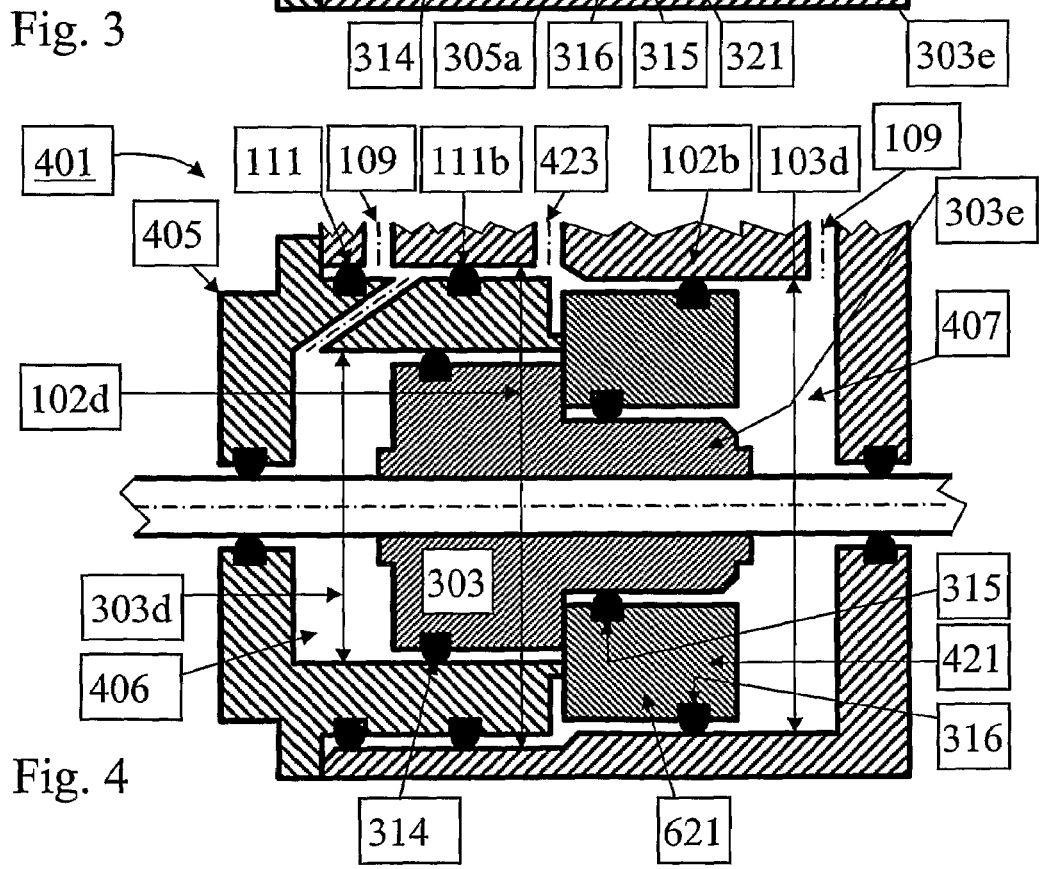
FIG. 4 shows an embodiment of the invention where the ring piston has its guiding devices located at different axial positions and where there is an increased diameter for the sealing device between the intermediate chamber and the pressure duct to the left pressure chamber.

This is solved in the modified actuator 401 in FIG. 4, which actuator also forms part of the inventive module system. There, the cylinder housing 102b has a larger diameter 102d where the breathing duct 423 for the intermediate chamber 422 ends. Hence, the risk of damaging the outer sealing device 316 at the assembly has been reduced greatly. Furthermore, the diameter 102d could be used for both static sealing devices 111 and 111b between the cover 405 and the cylinder housing 102b. Then, the static sealing devices 111 and 111b could be identical, which would save costs.

The ring piston 421 in the actuator 401 has been made wider than the corresponding ring piston 321 in FIG. 3. Thereby, several advantages have been gained. Firstly, the large cylindrical surface with diameter 103d in the cylinder housings 102, 102a and 102b has been used, so the volume of the right pressure chamber 407 has been minimized, which may improve the dynamic performance of the actuator 401. Secondly, it is no longer possible for the ring piston 421 to move that far to the right from the position in FIG. 4 that the inner sealing device 315 would no longer be in contact with the extension 303e of the main piston 303. Thirdly, the larger width of the ring piston 421 has made it possible to locate the sealing devices 315 and 316, with integrated guiding devices, significantly axially apart from each other. That will improve the stability against misalignment for the ring piston 421.

Figure 5:
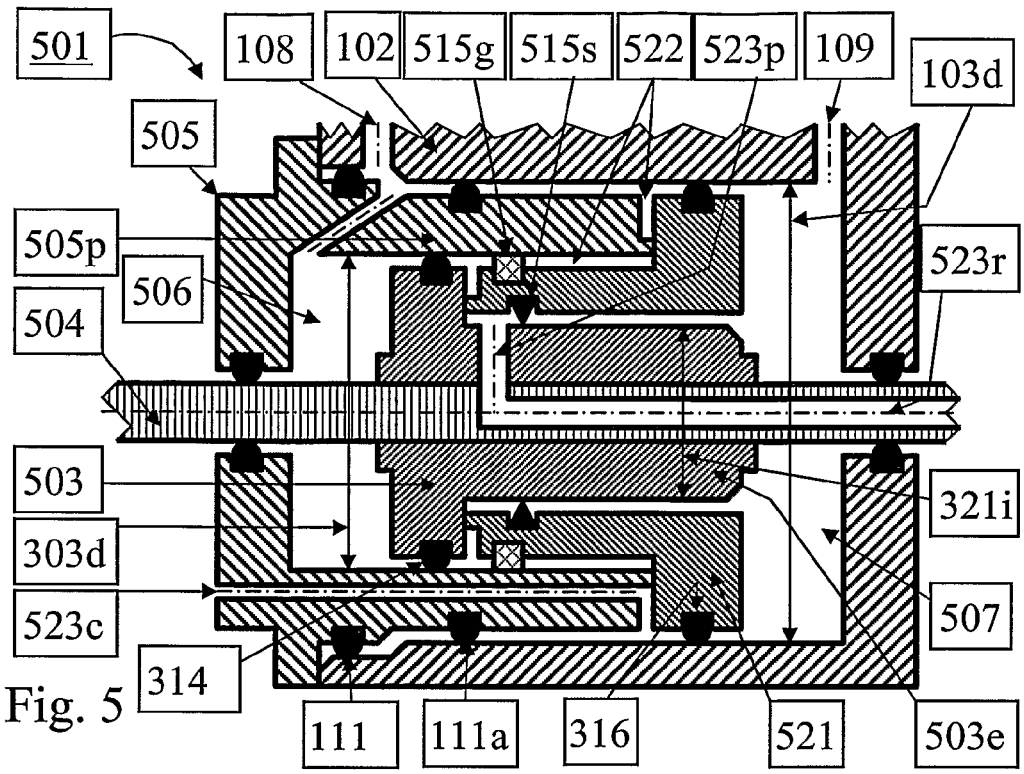
FIG. 5 shows an embodiment of the invention with modified ring piston and with breathing ducts for the intermediate chamber located in the cover and in the main piston and piston rod.

FIG. 5 shows a further modified actuator 501 of the variant with three stable positions. Actuator 501 also forms part of the inventive module system. There, the ring piston 521 has been extended axially inside the ring-shaped protrusion 505p of the cover 505. Thereby, the guiding devices are axially located even further apart than the actuator 401 in FIG. 4. Moreover, the inner sealing and guiding device has been separated into a pure sealing device 515s, acting on the inner cylinder-piston system diameter 321i, and a guiding device 515g that acts on the inside of the ring-shaped protrusion 505p. The guiding device 515g thereby acts on the main cylinder-piston system diameter 303d, which is larger and possibly stiffer than for the corresponding sealing and guiding device 315 in FIG. 3. Furthermore, with the ring piston 521 extending axially inside the ring-shaped protrusion 505p, the sealing device 515s will be in contact with the extension 503e of the main piston 503 even for the most extreme relative positions of the main piston 503 and ring piston 521.

FIG. 5 also shows two alternative breathing ducts for connecting the intermediate chamber 522 to ambient pressure. There is a cover breathing duct 523c in the cover 505 and a piston rod breathing duct composed of a mainly radial duct 523p in main piston 503 and a mainly axial duct 523r in piston rod 504. With any of these breathing ducts, the cylinder housing 102, as a finished part, can be identical for actuator variants with two and three stable positions.

Figure 6:
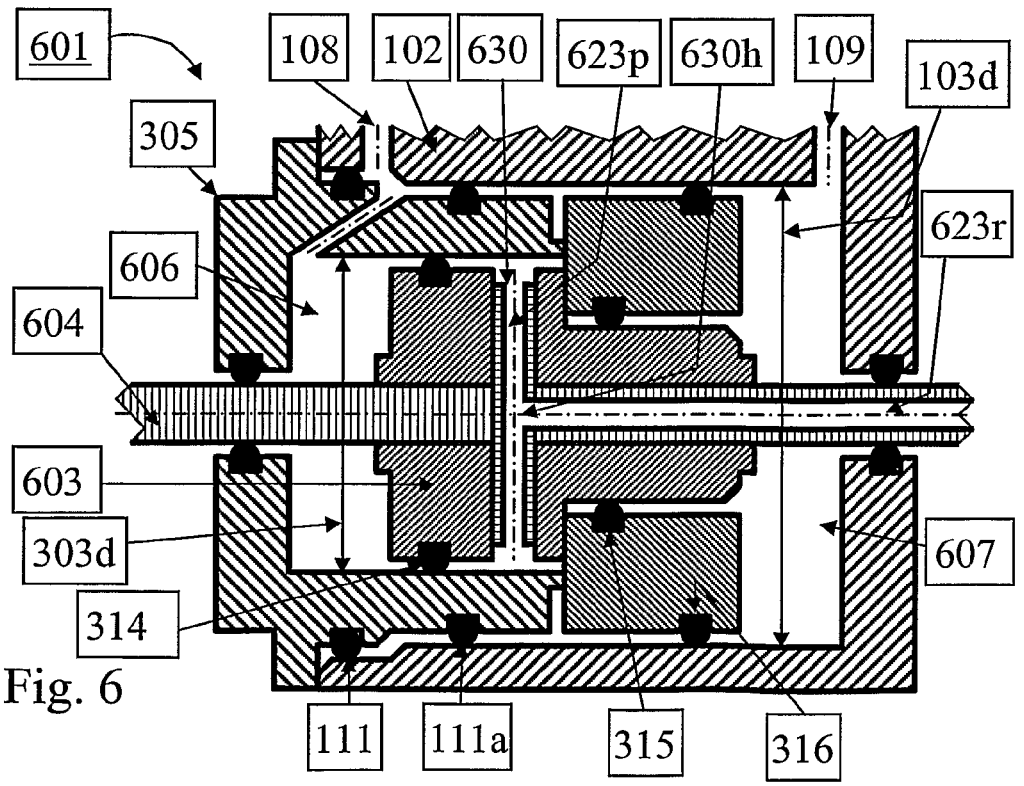
FIG. 6 shows an embodiment of the invention where the main piston is attached to the piston rod with a hollow pin that forms a part of the breathing duct for the intermediate chamber.

FIG. 6 shows another embodiment of a piston rod breathing duct in an actuator 601 of the variant with three stable positions, which actuator also forms part of the inventive module system. A substantially radial duct 623p through the main piston 603 and piston rod 604 is formed, at least in part, by a hollow pin 630 that fixedly connects the main piston 603 to the piston rod 604. The duct 623p is in fluid connection with a substantially axial duct 623r in the piston rod 604. This fluid connection could be achieved with, e.g., a slot or a radial hole 630h in the hollow pin 630. A corresponding ring piston is here numbered 621. Also in this case the cylinder housing 102, as a finished part, can be identical for actuator variants with two and three stable positions.

According to further embodiments of the invention it is also possible that at least one of said first and second pressure ducts and said first cylinder diameter are finally produced with same set of tools creating same dimensions for said at least one of said first and second pressure ducts and said first cylinder diameter respectively in both said two and three stable position variants. In yet another embodiment of the invention all of said first and second pressure ducts and said first cylinder diameter are finally produced with different sets of tools creating different dimensions for said first and second pressure ducts and said first cylinder diameter respectively, when comparing said two stable position variants with said three stable position variants. However, said blank is still identical for said two and three stable position variants.

Finally, in a preferred embodiment the actuator is arranged for controlling a splitter or range section in a vehicle transmission.

Although the present invention has been set forth with a certain degree of particularity, it is understood that various modifications, substitutions and rearrangements of the components are possible without' departing from the spirit and scope of the invention as hereinafter claimed.

The invention claimed is:

1. A module system for manufacturing two and three stable position fluid-operated actuators, the two stable position actuator comprising a first piston enclosed by a cylinder housing, where the first piston is fixedly connected to a piston rod that extends axially out through at least one of the cylinder housing and at least one cover in one of two ends of the cylinder housing, at least a first and a second pressure duct in the cylinder housing through which at least two pressure chambers, that are separated by the first piston, can selectively be set in fluid connection with a pressure supply or ambient pressure by valves, and the three stable position actuator comprising all above mentioned corresponding elements for the two stable position actuator plus a main piston and a breathing duct, the elements forming together two pressure chambers and a non-pressurized intermediate chamber, the chambers being separated by the main piston and a ring piston, which ring piston corresponds to the first piston, and where the cylinder housing of the both variants of two and three stable positions actuators are manufactured from a blank, wherein the blank comprises at least one opening for the cover and is identical for the variants of the two and three stable position actuators, and is at least prepared for the arrangement of the first pressure duct,
the second pressure duct and
a first cylinder diameter of the cylinder housing,
wherein in the variants:
the cylinder housing, the first piston and an outer sealing device for substantially axial motion compose an outer cylinder-piston system at the first cylinder diameter, and there is at least a first static sealing device between the cylinder housing and the at least one cover.

2. A module system as in claim 1, wherein at least one of the first and second pressure ducts and the first cylinder diameter are finally produced with same set of tools creating same dimensions for at least one of the first and second pressure duct and the first cylinder diameter respectively in both the two and three stable position variants.

3. A module system as in claim 1, wherein the first and second pressure ducts and the first cylinder diameter are finally produced with same set of tools creating same dimensions for the first and second pressure duct and the first cylinder diameter respectively in both the two and three stable position variants.

4. A module system as in claim 1, wherein the first static sealing device acts on a larger diameter than the first cylinder diameter in one of the variants.

5. A module system as in claim 4, wherein in the variant with three stable positions the ring piston is arranged with limited axial motion relative to the main piston, and that the inner periphery of the ring piston along with an inner sealing device and an extension that is integral with, or fixedly connected to, the main piston compose an inner cylinder-piston system at an inner diameter.

6. A module system as in claim 5, wherein the inner sealing device and the outer sealing device are arranged at axially separated positions.

7. A module system as in claim 1, wherein in the variant with three stable positions there is a ring-shaped part as an integral part of, fixedly connected to, or constantly mated to a first cover of the at least one cover, and that the inner periphery of the ring-shaped part, the main piston and a main sealing device compose a main cylinder-piston system at a main diameter.

8. A module system as in claim 7, wherein there is a second static sealing device arranged between the cylinder housing and the outer periphery of the ring-shaped part.

9. A module system as in claim 8, wherein the second static sealing device acts on the first cylinder diameter.

10. A module system as in claim 7, wherein the second static sealing device acts on a second diameter that is larger than the first cylinder diameter.

11. A module system as in claim 10, wherein the second diameter is substantially equal to the larger diameter, and that the first and second static sealing devices are identical.

12. A module system as in claim 1, wherein in the variant with three stable positions for a first chamber of the at least two pressure chambers a part of the fluid connection is provided by a cover supply duct in the first cover, in the ring-shaped part, or between the first cover and the ring-shaped part.

13. A module system as in claim 12, wherein at least a part of the breathing duct is provided by a cover duct in at least one of the ring-shaped part and the first cover.

14. A module system as in claim 12, wherein at least a part of the breathing duct is provided by a substantially axial duct in the piston rod.

15. A module system as in claim 14, wherein at least a part of the breathing duct is provided by a substantially radial duct in the main piston.

16. A module system as in claim 1, wherein in the variant with three stable positions a non-pressurized intermediate chamber is separated from the at least two pressure chambers by at least the main piston, the ring piston and the ring-shaped part.

17. A module system as in t claim 16, wherein the intermediate chamber is in constant fluid connection with ambient pressure and that the constant fluid connection is provided at least in part by the breathing duct.

18. A module system as in claim 17, wherein at least a part of the breathing duct is a housing duct in the cylinder housing.

19. A module system as in claim 17, wherein the cylinder housing as a finished part is identical for actuator variants with two and three stable positions, in those three stable position variants where the breathing duct is only arranged in one or several of the cover, the piston rod or the main piston.

* * * * *